(12) United States Patent
Baumgartner

(10) Patent No.: US 7,059,861 B1
(45) Date of Patent: Jun. 13, 2006

(54) MATH MANIPULATIVE EDUCATIONAL LEARNING GAME

(76) Inventor: Margaret E. Baumgartner, 43 W. 720 Nottingham Dr., Elburn, IL (US) 60119

( * ) Notice: Subject to any disclaimer, the term of this patent is extended or adjusted under 35 U.S.C. 154(b) by 52 days.

(21) Appl. No.: 10/465,370

(22) Filed: Jun. 19, 2003

Related U.S. Application Data

(62) Division of application No. 10/021,938, filed on Dec. 13, 2001, now Pat. No. 6,609,712.

(60) Provisional application No. 60/255,287, filed on Dec. 13, 2000.

(51) Int. Cl.
G09B 19/02 (2006.01)

(52) U.S. Cl. .................................. 434/195; 434/191

(58) Field of Classification Search ............ 434/188, 434/191, 194, 195, 196, 203, 204, 205, 207, 434/211; 273/276, 153 R
See application file for complete search history.

(56) References Cited

U.S. PATENT DOCUMENTS

| | | | |
|---|---|---|---|
| 1,183,570 A | 5/1916 | Kneeshaw | |
| 1,471,437 A | 10/1923 | Wood | |
| 2,297,011 A * | 9/1942 | Mooney | ............ 434/107 |
| 2,494,469 A | 1/1950 | Booth | |
| 2,494,497 A * | 1/1950 | Trapnell | ............ 434/204 |
| 2,899,757 A | 8/1959 | Webb | |
| 2,950,542 A | 8/1960 | Steelman | |
| 3,094,792 A | 6/1963 | Morgan et al. | |
| 3,204,343 A | 9/1965 | Pollock | |
| 3,229,388 A | 1/1966 | Smith | |
| 3,410,002 A | 11/1968 | MulHolland et al. | |
| 3,643,347 A * | 2/1972 | Ziering | ............ 434/189 |
| 4,518,359 A | 5/1985 | Yao-Psong | |

(Continued)

OTHER PUBLICATIONS

Dr. John C. del Regato, Ramrod™, Mathematics Pentathlon, 1980, 1986, 1991, pp. 49058, Published by Pentathlon Institute, Inc.

*Primary Examiner*—Kurt Fernstrom
(74) *Attorney, Agent, or Firm*—Woodard, Emhardt, Moriarty, McNett & Henry LLP

(57) ABSTRACT

The present invention relates to a math manipulative educational learning game in which a plurality of rods are provided for use in various manipulative games designed to teach rudimentary arithmetic skills. In the preferred embodiment, the rods are of various lengths and/or volumes, with the shortest length comprising a unit length, and other rods being formed in integral multiples of the unit length. Various games are disclosed in which a child is encouraged to manipulate the rods in various ways and in order to learn various arithmetic lessons. For example, in one game a Game Master selects any of the rods except the rod having unit length and places it upon a game playing surface. Thereafter, the Partner must select a plurality of rods whose combined lengths equal the length of the rod played by the Game Master. These rods are laid end-to-end along side the rod played by the Game Master in order to demonstrate their length equality. The Game Master then selects another rod other than the rod of unit length and lays the second rod end-to-end with the first rod which the Game Master played. The Partner is again required to select a plurality of rods to whose combined lengths, when placed end-to-end with the rods already played by the Partner, equal the length of the rods played by the Game Master. The play continues in this manner until no more moves may be made from the selection of rods remaining. Other manipulative games are also disclosed.

2 Claims, 8 Drawing Sheets

U.S. PATENT DOCUMENTS

| | | |
|---|---|---|
| 4,547,160 A | 10/1985 | Labelle |
| RE32,950 E * | 6/1989 | Graube ....................... 434/126 |
| 5,297,965 A | 3/1994 | Manancero |
| 5,421,732 A * | 6/1995 | Taylor ........................ 434/195 |
| 5,597,308 A | 1/1997 | Woldenberg et al. |
| 6,575,754 B1 * | 6/2003 | Salvo ......................... 434/195 |

* cited by examiner

MATH MANIPULATIVE EDUCATIONAL LEARNING GAME

CROSS-REFERENCE TO RELATED APPLICATIONS

The present application is a divisional application of U.S. application Ser. No. 10/021,938, filed Dec. 13, 2001 now U.S. Pat. No. 6,609,712, which claims the benefit of U.S. Provisional Patent Application Ser. No. 60/255,287, filed Dec. 13, 2000, the text and drawings of which are hereby incorporated by reference in their entireties.

BACKGROUND OF THE INVENTION

It is well-known that children, particularly pre-school aged children, may be enticed to learn various principles through the use of play. By incorporating lessons into the game that is played, a child's attention may be captured by the enjoyment of playing the game, while at the same time the child is gaining experience in important concepts, often without even realizing that he or she is being taught. This concept may start with extremely rudimentary concepts at very young ages, such as the development of hand-to-eye coordination by the simple grasping, moving, holding, dropping, etc. of simple objects. Once simple motor skills have been developed, the child progresses incrementally to even more complicated lessons.

Even abstract subjects such as mathematics can be grounded in a child through the use of well-designed play. It is usually easier for a child to learn through the association of visual representations than by simple memorization, and concepts learned in this manner are usually retained by the child for a longer period of time. This is especially true of the rudimentary arithmetic processes such as addition, subtraction, etc. By presenting to the child a series of physical objects that correspond to the abstract principles, the young mind is more readily able to comprehend such quantities by mechanical means rather than by more difficult abstract reasoning.

In light of this, many toys and games are known in the prior art that are designed to teach some basic arithmetic skills; however, it has been found that such games are normally limited in the number of rudimentary concepts that can be taught to the child by use of the game, are uninteresting to many children, or are difficult to use. The present invention is therefore directed toward providing a physically manipulative game that is fun to play, allows for the participation of a teacher or another child, and teaches a great variety of rudimentary skills, rather than being limited to just two or three.

SUMMARY OF THE INVENTION

The present invention relates to a math manipulative educational learning game in which a plurality of rods are provided for use in various manipulative games designed to teach rudimentary arithmetic skills. In the preferred embodiment, the rods are of various lengths and/or volumes, with the shortest length comprising a unit length, and other rods being formed in integral multiples of the unit length. Various games are disclosed in which a child is encouraged to manipulate the rods in various ways and in order to learn various arithmetic lessons. For example, in one game a Game Master selects any of the rods except the rod having unit length and places it upon a game playing surface. Thereafter, the Partner must select a plurality of rods whose combined lengths equal the length of the rod played by the Game Master. These rods are laid end-to-end along side the rod played by the Game Master in order to demonstrate their length equality. The Game Master then selects another rod other than the rod of unit length and lays the second rod end-to-end with the first rod which the Game Master played. The Partner is again required to select a plurality of rods whose combined lengths, when placed end-to-end with the rods already played by the Partner, equal the length of the rods played by the Game Master. The play continues in this manner until no more moves may be made from the selection of rods remaining. Other manipulative games are also disclosed.

In one form of the invention, a method of playing a math manipulative educational learning game between a Game Master and a Partner is disclosed, comprising the steps of a) Providing a kit comprising a plurality of rods of varying lengths, wherein a shortest length rod is designated as having a unitary length, wherein each other of said varying lengths is a multiple of said unitary length, and wherein each of said rods has a side and an end; b) Game Master placing on a game surface a first rod selected from any of said rods except said rod having unitary length, said first rod having a first rod length; c) Partner placing on said game surface adjacent said side of said first rod a first plurality of rods end-to-end having a combined length equal to said first rod length; d) Game Master placing on said game surface a second rod selected from any of said rods except said rod having unitary length, said second rod having a second rod length, said second rod being placed end-to-end with said first rod; e) Partner placing on said game surface a second plurality of rods end-to-end with said first plurality of rods, said second plurality of rods having a combined length equal to said second rod length; and f) Repeating steps (d) and (e) until not enough of said rods are left to make a play.

In another form of the invention, a method of playing a math manipulative educational learning game between a Game Master and a Partner is disclosed, comprising the steps of a) Providing a kit comprising a plurality of rods of varying lengths, wherein a shortest length rod is designated as having a unitary length, wherein each other of said varying lengths is a multiple of said unitary length, and wherein each of said rods has a side and an end; b) Game Master placing on a game surface a first rod selected from any of said rods except said rod having unitary length, said first rod having a first rod length; c) Game Master establishing an inequality; d) Partner placing on said game surface adjacent said side of said first rod a first plurality of rods end-to-end having a combined length equal to said first rod length plus said inequality; e) Game Master placing on said game surface a second rod selected from any of said rods, said second rod having a second rod length, said second rod being placed end-to-end with said first rod; f) Partner placing on said game surface a second plurality of rods end-to-end with said first plurality of rods, said first and second plurality of rods having a combined length equal to said first and second rod length plus said inequality; and g) Repeating steps (d) and (e) until not enough of said rods are left to make a play.

In yet another form of the invention, a method of playing a math manipulative educational learning game between a Game Master and a Partner is disclosed, comprising the steps of a) Providing a kit comprising a plurality of rods of varying lengths, wherein a shortest length rod is designated as having a unitary length, wherein each other of said varying lengths is a multiple of said unitary length, and wherein each of said rods has a side and an end; b) Game Master placing on a game surface a first rod selected from any of said rods except said rod having unitary length, said first rod having a first rod length; c) Game Master establishing a pattern comprising a series of inequalities; d) Partner placing on said game surface adjacent said side of said first rod a first plurality of rods end-to-end having a combined length equal to said first rod length plus a first inequality in said pattern; e) Game Master placing on said game surface a second rod selected from any of said rods, said second rod having a second rod length, said second rod being placed end-to-end with said first rod; f) Partner placing on said game surface a second plurality of rods end-to-end with said first plurality of rods, said second plurality of rods having a combined length equal to said second rod length plus a second inequality in said pattern; and g) Repeating steps (d) and (e) until not enough of said rods are left to make a play.

In another form of the invention, a method of playing a math manipulative educational learning game between a Game Master and a Partner is disclosed, comprising the steps of a) Providing a kit comprising a plurality of rods having hollow interiors of varying volumes, wherein a smallest volume rod is designated as having a unitary volume, wherein each other of said varying volumes is a multiple of said unitary volume; b) Game Master selecting a first rod selected from any of said rods except said rod having unitary volume, said first rod having a first volume; c) Partner selecting a first plurality of rods having a combined volume equal to said first rod volume; d) Completely filling said first plurality of rods with a substance; and e) Pouring said substance from said first plurality of rods into said first rod in order to verify that said combined volume equals said first volume.

In yet another form of the invention, a math manipulative educational learning game is disclosed, comprising a plurality of rods, each of said rods having a longitudinal section removed therefrom so that each of said rods will lie on a flat surface without rolling; wherein each of said rods have varying lengths, wherein a shortest length rod is designated as having a length defining one unit of length, wherein each other of said varying lengths is a multiple of said unit of length; and one or more notches formed into a surface of each of said rods, wherein each said notch is positioned substantially at a midpoint of each unit of length of said rod.

In another form of the invention, a math manipulative educational learning game is disclosed, comprising a plurality of rods; wherein each of said rods have varying lengths, wherein a shortest length rod is designated as having a length defining one unit of length, wherein each other of said varying lengths is a multiple of said unit of length; and one or more notches formed into a surface of each of said rods, wherein each said notch is positioned substantially at a midpoint of each unit of length of said rod.

DETAILED DESCRIPTION OF THE PREFERRED EMBODIMENTS

Figure 1:
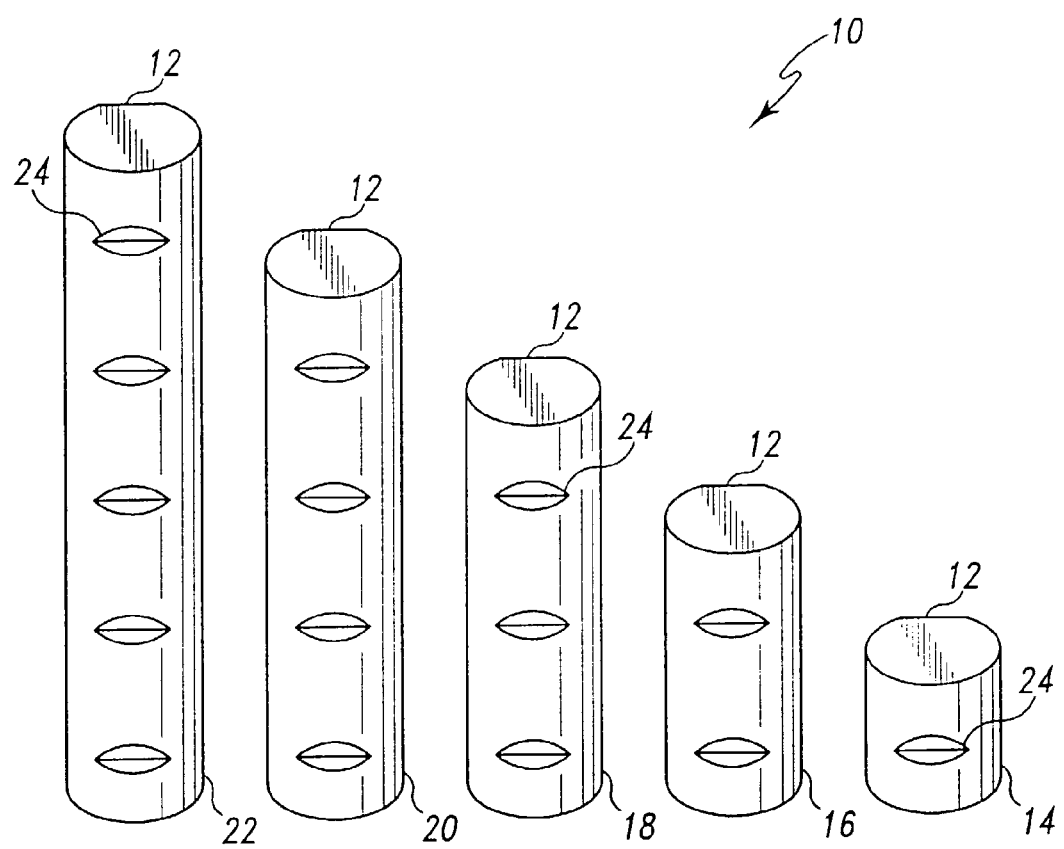
FIG. 1 is a side elevational view of a plurality of rods, having varying lengths, of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Referring to FIG. 1, there is illustrated a plurality of rods of the present invention, indication generally at 10, which may be utilized to play the math manipulative educational learning games disclosed hereinbelow. As used herein, the term "rods" is meant to signify any game piece, no matter what the physical shape of the game piece, which has the physical attributes necessary to play one of the games disclosed herein. For example, the rods 10 may be cylindrical, cubic, pyramidal or other shapes, so long as they are able to exhibit length and/or volume as required for execution of the games disclosed hereinbelow.

In the preferred embodiment, the rods 10 are formed in the shape of a cylinder in which one side has been sliced off parallel to the longitudinal axis of the rod 10. Such slicing creates a flat surface 12 on one side of the rod 10, which is useful to allow the rod 10 to be laid upon a flat surface without rolling.

In the preferred embodiment, the rods 10 are fashioned from maple or similar hardwood cylinders. However, the present invention comprehends that the rods 10 may be formed from any suitable material, such as plastic, metal, cardboard, pressed paper, etc. The material from which the rods 10 are constructed is not critical; however, the material should be non-toxic as the rods 10 are designed for use by children.

In the preferred embodiment, there are cylinders 14, 16, 18, 20 and 22 which are formed from maple in a one-inch diameter cylinder prior to forming the flat surface 12. The rod 14 is designated as having a unit length, while the rod 16 has a length of two units, the rod 18 has a length of three units, the rod 20 has a length of four units, and the rod 22 has a length of five units. In the preferred embodiment, the unit length rod 14 is one inch long. The present invention also comprehends that the unit length may be an even metric (S.I.) length, such as one centimeter. Other systems of measurement may be utilized without departing from the principles of the present invention. In the preferred embodiment, there are five of each of the rods 14–22.

On the side of each of the preferred embodiment rods 10 opposite to the flat side 12, one or more shallow "V" notches are formed into the surface of the rod 10. The number of notches formed into any rod 10 is preferably equal to the number of unit lengths represented by the rod 10. In the preferred embodiment, the notches 24 are placed one-half inch from each end of the rod 10, and additional notches 24 (if necessary) are formed into the rod 10 on one-inch centers. For example, the five unit length rod 22 has five notches 24 formed therein, two of the notches being one-half inch from either end and the other three notches being spaced at one-inch intervals from these two notches 24. Similarly, the unit length rod 14 has a single notch 24 which is positioned one-half inch from both ends. This will be appreciated, the notches 24 therefore appear at the mid-point of each one-inch increment of the rod 10. The provision of the notches 24 allow a child using the rods 10 to not only ascertain their lengths by inspection of their physical dimensions, but to also see and count their lengths as represented by the number of notches 24 formed into each rod 10.

The rods 10 may be left unfinished, or they may be finished in a non-toxic child-safe clearcoat finish, or they may be finished in non-toxic child-safe colors. In the preferred embodiment, each of the five rods 14 is finished in a different color, each of the five rods 16 is finished in a different one of these same colors, and so on. In the preferred embodiment, therefore, each rod 10 length is represented once in each of the five colors.

Figure 2:
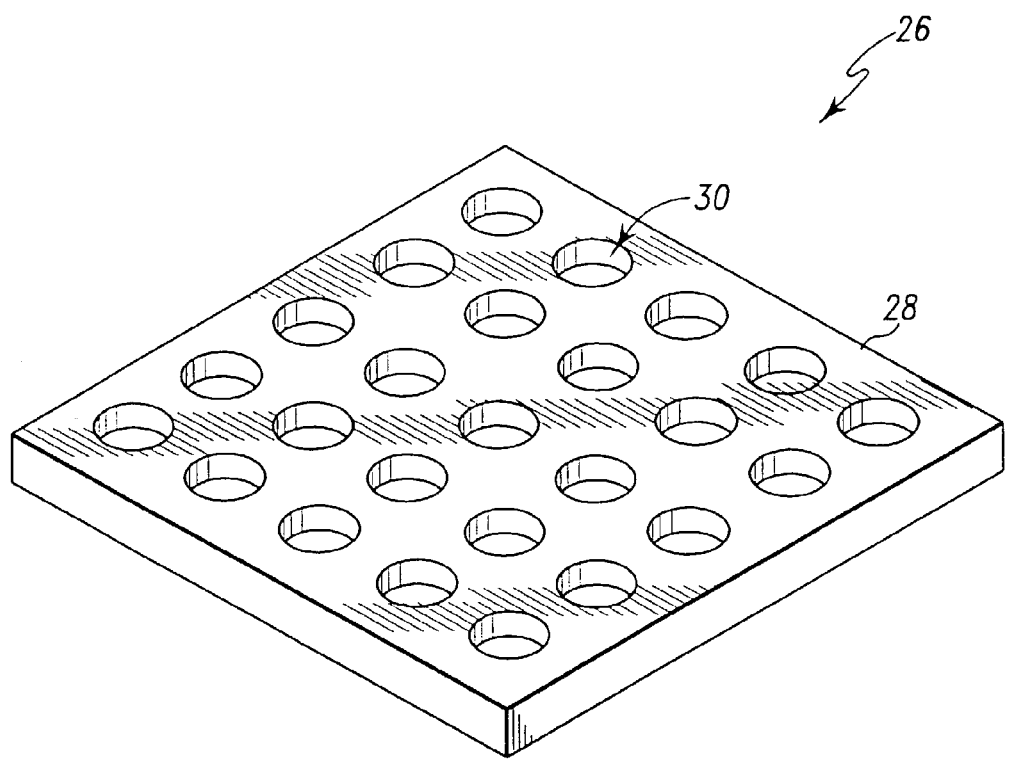
FIG. 2 is a perspective view of a base of the present invention which may be used to hold the rods of FIG. 1.

The complete set of rods 10 in the preferred embodiment of the present invention may be conveniently held by the base 26 illustrated in FIG. 2. The base 26 is preferably formed from a piece (or multiple pieces joined together) of maple or similar hardwood 28. As with the rods 10, the material from which the base 28 is constructed is not considered critical to the present invention. A five-by-five grid of holes 30 is then drilled into the wood 28, wherein the diameter of each hole 30 is sufficient to allow a rod 10 to be easily placed therein. As with the rods 10, the base 26 may also be finished in a non-toxic child-safe clearcoat finish or colored finish. For attractive storage, the rods 10 are placed into the holes 30 by placing the rods 22 into all of the holes 30 at the back of the base 26. The rods 20 are then placed in the holes 30 in the row immediately in front of the rods 22. The rods 18 are then placed into the next row and so on moving toward the front of the base 26. If the rods 10 are colored as indicated above, then each column of the base 26 (front to back) contains rods 14–22 of the same color. By removing the rods 10 from the base 26 and having a child replace the rods 10 into the base 26, the child is encouraged to explore the concepts of order (both ascending and descending), length and special relationship. If the rods 10 are colored as indicated above, then the child is additional 14 encouraged to explore the concepts of "sameness" and "differentness" by arranging the rods 10 of different lengths based upon their similar colors.

Figure 3:
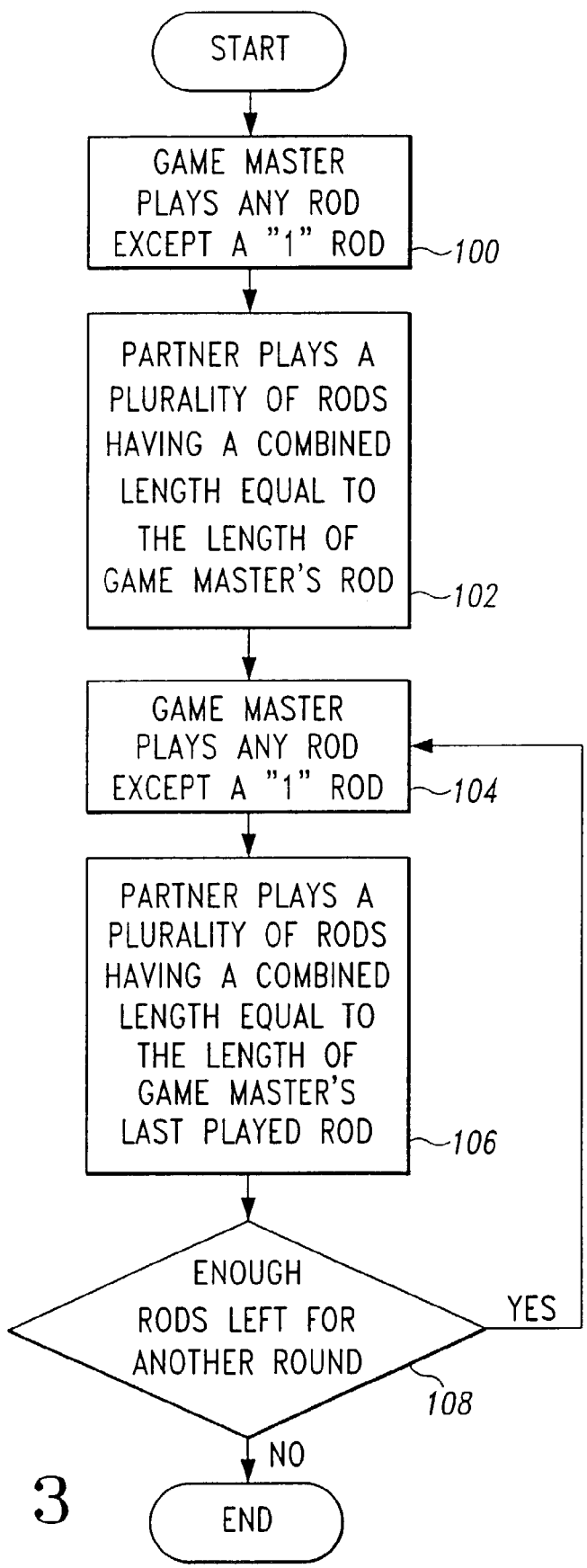
FIG. 3 is a schematic process flow diagram of a first embodiment math manipulative educational learning game of the present invention.

The set of rods 10 may be used for playing a variety of math manipulative educational learning games. For example, FIG. 3 illustrates the steps in a first embodiment game of the present invention. Starting at 100, the Game Master selects any of the rods 10 other than the unit length rod 14 as the first rod to play. This selected rod is preferably placed horizontally upon a flat game playing surface, such that the flat side 12 rests upon the game playing surface. In alternative embodiments, the rods 10 may be placed vertically, such that rods can be stacked one on top of another. In step 102, the second player, the Partner, must select a plurality of rods 10 from the rods remaining in the set such that the combined lengths of the rods selected by the Partner equal the length of the rod played by the Game Master at step 100. The Partner then places these selected rods 10, end-to-end, alongside the rod played by the Game Master. In doing so, both the lengths and the notches 24 of the rods in the two rows will align. In the preferred embodiment, the Partner may not play the same length rod that was played by the game master. In this way, Partner is encouraged to explore the concepts of addition and relative lengths in order to find two or more rods 10 whose lengths equal the length of the rod played by the Game Master.

Figure 4:
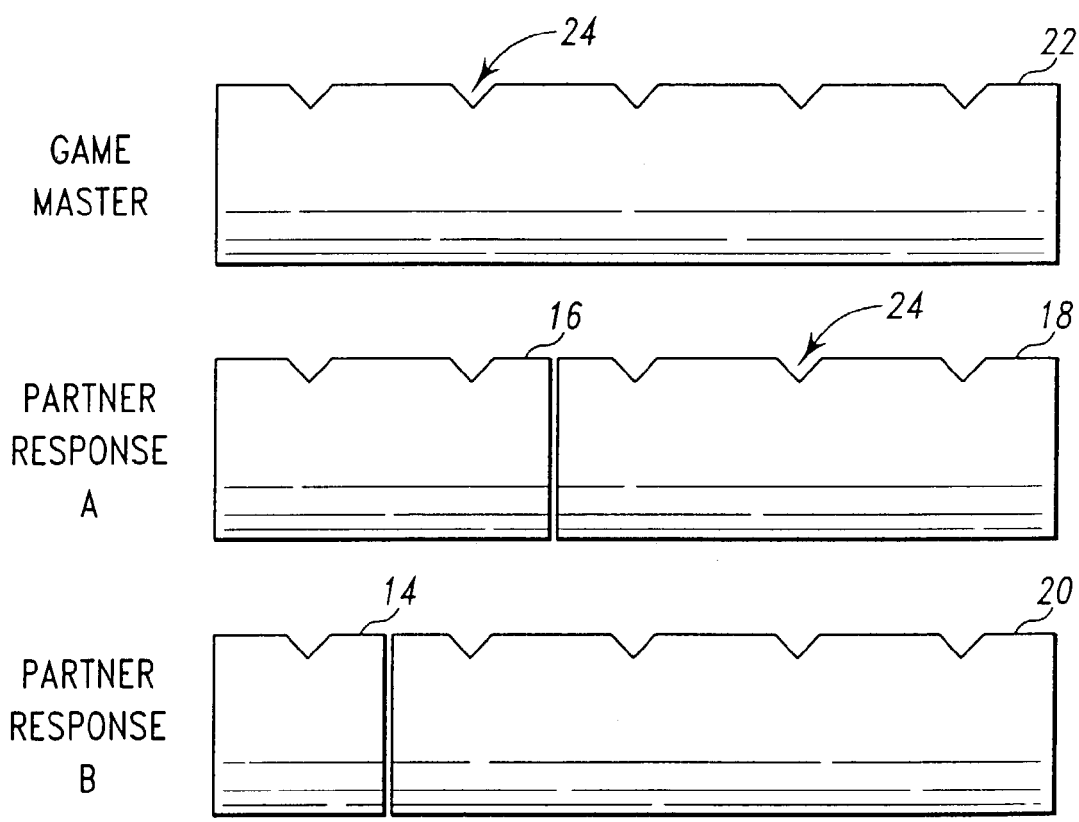
FIG. 4 is a side elevational view of the rods of FIG. 1 being used in the game of FIG. 3, in progress.

For example, FIG. 4 illustrates a game of Equals in progress in which the Game Master has selected and played a rod 22 having five units of length. FIG. 4 illustrates two possible responses by Partner. In Partner response A, a rod 16 having two units of length and a rod 18 having three units of length are selected by Partner and laid down end-to-end beside the rod 22 played by Game Master. In this manner, Partner is able to see that three plus two equals five by comparing the lengths of the two rows of rods 10 as well as the alignment of the notches 24. In alternative response B, Partner may choose a rod 14 of unit length and a rod 20 having four units of length. Either response A or response B would be correct in view of the play of rod 22 by Game Master.

Returning now to FIG. 3, the game of Equals continues at step 104 as Game Master selects another rod 10 (any rod except the rod 14 of unit length) and plays this rod by placing it end-to-end with the rod played at step 100. At step 106, Partner is again required to select two or more rods 10 from the rods remaining to be played such that the combined lengths of the selected rods equal the length of the rod selected by Game Master at step 104. Once these are selected, they are placed end-to-end with the rods played by Partner at step 102.

At step 108, the players must determine if there are enough rods 10 left which have not yet been played in order for another round of the game to be played. If the answer is yes, then the process loops back to step 104 for the Game Master to make another selection. If it is determined that not enough rods remain for another round of play, then the game ends. The players are encouraged to discuss possible moves and their consequences in a cooperative effort in order to improve their score.

Scoring of the game of equals may be done on two levels. An easier method of scoring for beginners is simply to count the number of rods left in the base 26 after no more plays are left. The best possible score is to have only one rod left of any value. A more advanced scoring method is for players to add up the length values of all rods left in the base 26 in order to obtain their score. The best score is to only have one rod 14 of unit length remaining at the end of play.

Figure 5:
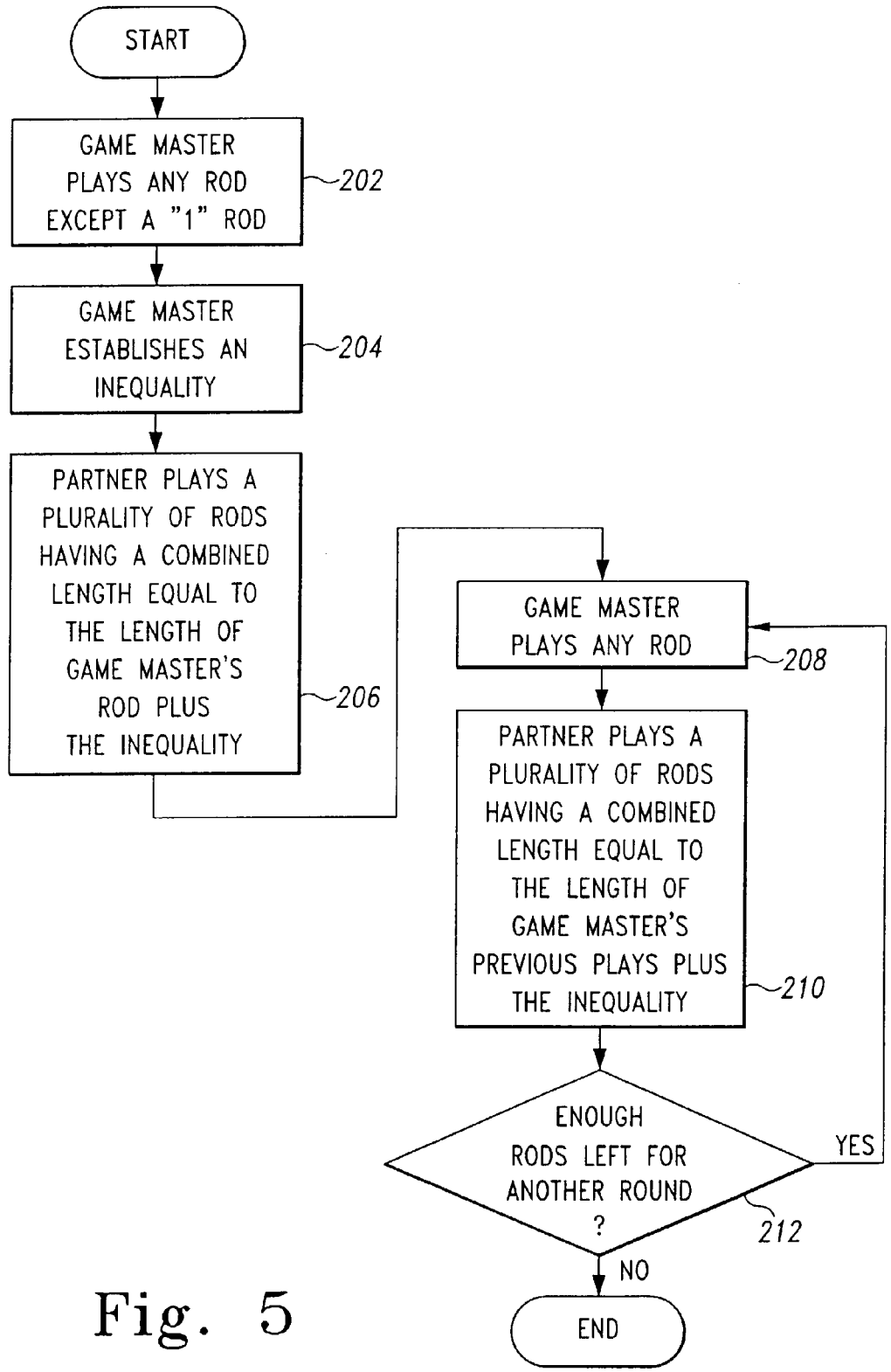
FIG. 5 is a schematic process flow diagram of a second embodiment math manipulative educational learning game of the present invention.

Referring now to FIG. 5, there is illustrated a schematic process flow diagram of a second preferred embodiment game of the present invention. Play begins in this game at step 202 in which Game Master selects any of the rods 10 for play except for a rod 14 of unit length. This rod is again played by Game Master by laying the flat side 12 upon the game playing surface. At step 204, Game Master establishes an inequality for the game. It will be appreciated that step 204 may also be executed by Game Master prior to step 202. Inequality is established at step 204 by the Game Master informing Partner the quantity of inequality that must exist between Game Master's play and Partner's play during each round. For example, Game Master may tell Partner that his response must always be one more, or two less, or three more, etc. than Game Master's previous move. In the preferred embodiment, a single value of inequality is kept for the entire game; however, the present invention also comprehends other embodiments in which the inequality value changes with each round.

At step 206, Partner selects a plurality of rods 10 which have a combined length equal to the rod 10 played by Game Master at 202, plus the inequality established at step 204. If the inequality is a positive value, then the combined length of the rods 10 played by Partner at step 206 will exceed the length of the rod 10 played by Game Master at step 202. On the other hand, if the inequality is negative, then the combined length of the rods 10 played by Partner at step 206 will be less than the length of the rod 10 played by Game Master at step 202. The game continues at step 208 in which Game Master selects another rod 10 from those which have not yet been played and places it end-to-end next to the rod played at step 202. Partner then selects a plurality of rods at step 210 such that when these rods are placed end-to-end with the rods played at step 206, the entire combined length of all of these rods is equal to the entire combined length of the rods already played by Game Master plus the inequality value. At step 212, Game Master and Partner determine if there are enough rods 10 left unplayed in order to execute another round. If this is found to be the case, then play continues at step 208, otherwise the game ends.

Figure 6:
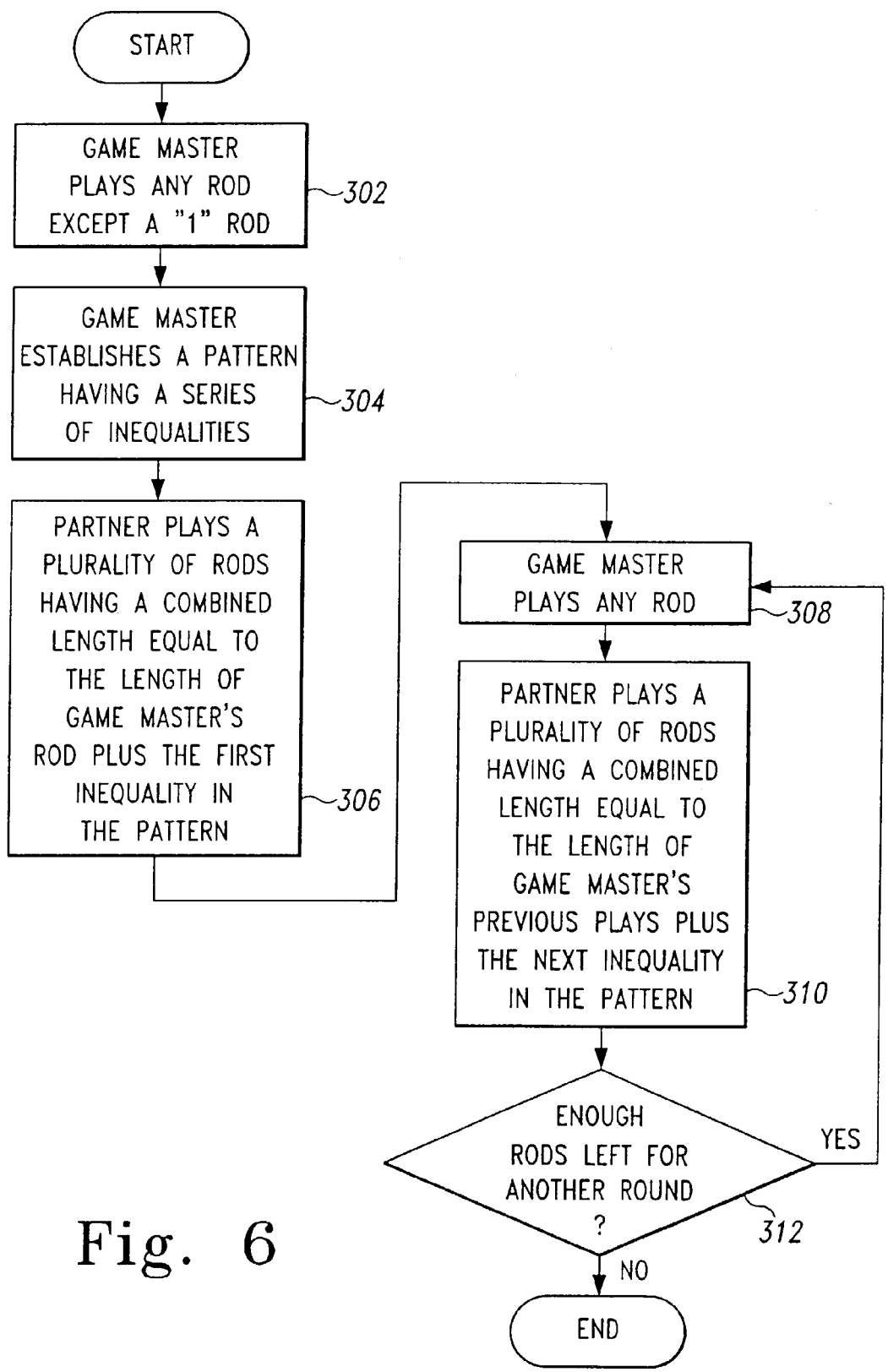
FIG. 6 is a schematic process flow diagram of the third embodiment math manipulative educational learning game of the present invention.

Referring now to FIG. 6, there is illustrated a third embodiment math manipulative educational learning game of the present invention. The game begins at step 302 in which Game Master selects one of the rods 10 from the set except the rod 14 having unit length. This rod 10 is played by Game Master by laying the flat side 12 of the rod 10 onto a flat game playing surface. At step 304, game master establishes a pattern having a series of inequalities which Partner must follow. For example, Game Master may establish that Partner's responses must follow a pattern of one more than Game Master's initial move. A second time Partner plays, his move must be two more than Game Master's second move, then follow an alternating, repeating pattern of one more, two more, etc. The present invention comprehends the establishment of any pattern by Game Master at step 304.

At step 306, Partner selects a plurality of rods 10 from those yet to be played, in which the rods 10 selected by Partner have a combined length equal to the length of Game Master's rod 10 which was played at step 302 plus the first inequality in the pattern set by Game Master at step 304. At step 308, Game Master selects another rod 10 to be played and places it end-to-end with the rod played at step 302. At step 310, Partner must select a plurality of rods 10 from those yet to be played, such that the combined length of the rods selected at steps 306 and 310 match the length of the Game Master's prior plays plus the next inequality in the pattern. It should be noted that the pattern may establish that the inequality between Partner's play and Game Master's play may apply only to the rods played in the current round, or the inequality may apply to the cumulative length of the rods played in the game up to this point. At step 312, the players determine whether enough rods 10 remain unplayed for another round, and if so, play resumes at step 308. If not enough rods 10 remain, then the game ends.

It should be noted that the preferred embodiment of the present invention utilizes the flat side 12 of the rods 10 for placing the rods 10 upon a flat game playing surface. The present invention, however, comprehends that the rods 10 may not be necessarily placed horizontally upon a flat surface. For example, the rods 10, if formed in a cylindrical configuration, may be stacked vertically one on top of the other. In order to facilitate this, the rods 10 may be fashioned with one male end and one female end in order to allow the rods 10 to be more securely mated to one another when stacking.

Figure 7:
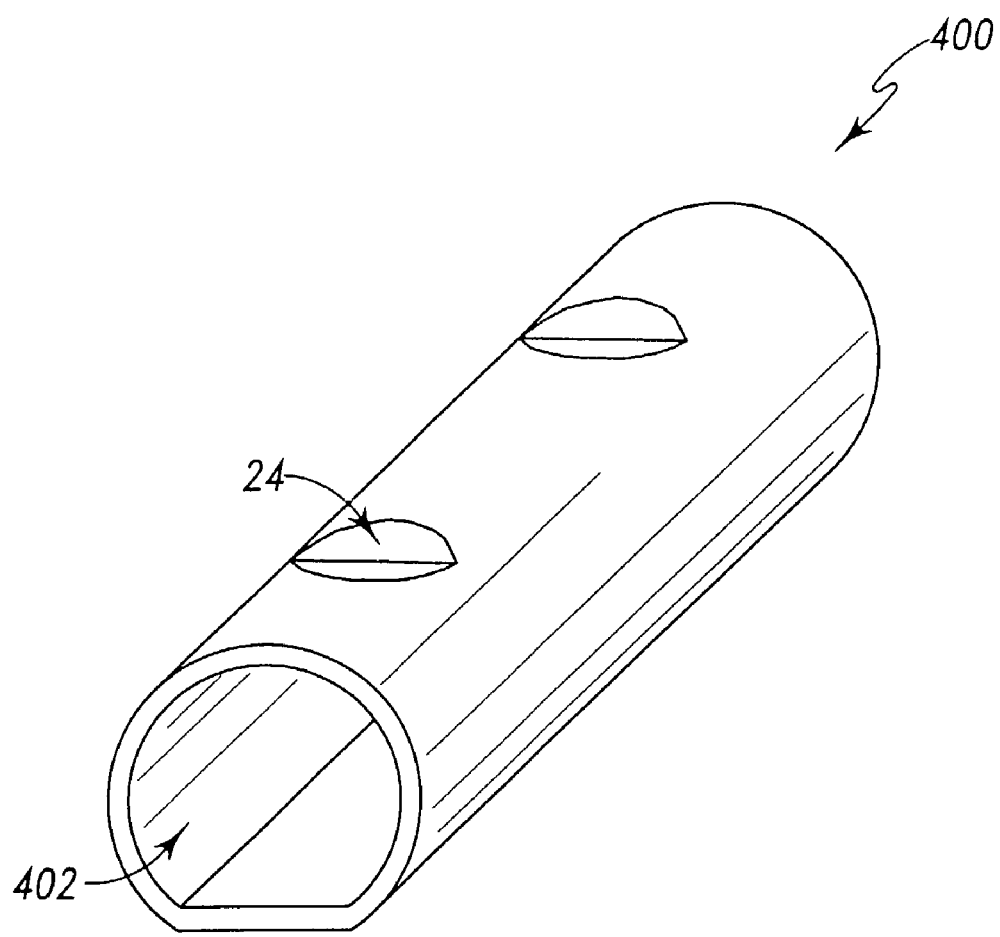
FIG. 7 is a perspective view of a second embodiment rod of the present invention having a hollow interior volume.

Referring now to FIG. 7, there is illustrated a second embodiment rod of the present invention, indicated generally at 400. The rod 400 has the same characteristics as described hereinabove with respect to the rod 10, including all of the variations thereto, except for the fact that the rod 400 includes a hollow interior cavity 402 having a specific volume. For example, if a rod 400 has a unit length, then the hollow cavity 402 will establish a unit volume. Other rods 400 in the set which exhibit lengths that are integral multiples of the unit length would correspondingly have interior cavities 402 whose volumes are also integral multiples of the unit volume. In the preferred embodiment, the rods 400 are preferably formed from molded plastic in order to provide for greater ease of manufacturing, although the present invention comprehends that the rods 400 may be made from any material as explained hereinabove with respect to the rods 10.

Use of the rods 400 allow the players to compare volume and capacity by filling the rods 400 with any suitable material which can easily be used to occupy the space in the hollow cavity 402, such as cornmeal, water, etc.

Figure 8:
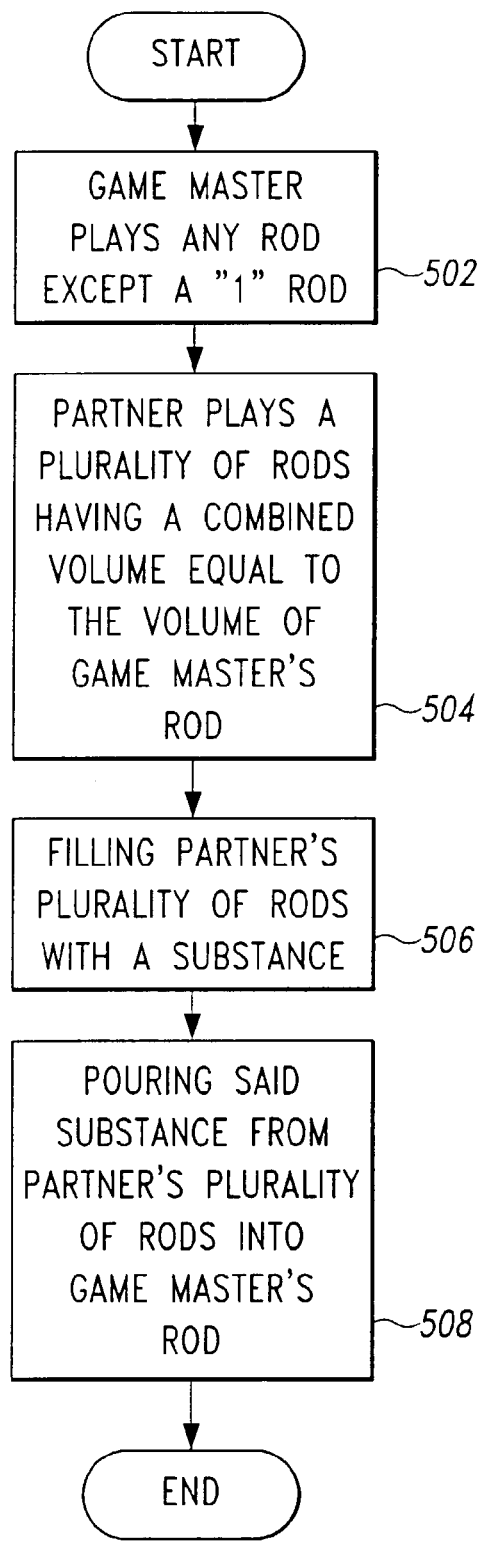
FIG. 8 is a schematic process flow diagram of fourth embodiment math manipulative educational learning game of the present invention which utilizes the hollow rods of FIG. 7.

FIG. 8 illustrates a schematic process flow diagram of a game which may be played with the hollow rods 400. The game starts at step 502, in which game master selects any of the rods 400 from the set except the rod 400 of unit volume. Partner then, at step 504, selects a plurality of rods 400 from those remaining to be played which have a combined volume equal to the volume of the rod 400 played by Game Master at step 502. For example, if Game Master plays a rod having five units of volume at step 502, then the Partner may select a rod having three units of volume and a second rod having two units of volume to play in step 504. At step 506, the rods 400 selected by Partner at step 504 are filled with a substance placed into the hollow cavities 402. At step 508, the substance is poured from Partner's rods 400 into Game Master's rod. If Partner has correctly chosen rods to play, then the substance, which precisely filled the interior volumes of Partner's multiple rods, should also precisely fill the volume of the single rod played by Game Master at step 502. In this way, children are encouraged to explore the concepts of addition, volume and length.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of playing a math manipulative educational learning game between a Game Master and a Partner, comprising the steps of:
    a) Providing a kit comprising a plurality of rods having hollow interiors of varying volumes, wherein a smallest volume rod is designated as having an unitary volume, wherein each other of said varying volumes is a multiple of said unitary volume;
    b) Game Master selecting a first rod selected from any of said rods except said rod having unitary volume, said first rod having a first volume;
    c) Partner selecting a first plurality of rods having a combined volume equal to said first rod volume;
    d) Completely filling said first plurality of rods with a substance; and e) Pouring said substance from said first plurality of rods into said first rod in order to verify that said combined volume equals said first volume.

2. A math manipulative educational learning game, comprising:

a first number of rods, wherein said rods define an interior volume proportional to the length of said rods, the interior space constructed and arranged for containing a poured substance; wherein each of said rods have varying lengths, wherein a shortest length rod is designated as having a length defining one unit of length, wherein each other of said varying lengths is a multiple of said unit of length; and one or more notches formed into a surface of each of said rods, wherein each said notch is positioned substantially at a midpoint of each unit of length of said rod.

* * * * *